(12) United States Patent
Jaffee

(10) Patent No.: US 7,582,132 B2
(45) Date of Patent: *Sep. 1, 2009

(54) NONWOVEN FIBROUS MAT FOR MERV FILTER AND METHOD

(75) Inventor: Alan Michael Jaffee, Bowling Green, OH (US)

(73) Assignee: Johns Manville, Denver, CO (US)

( * ) Notice: Subject to any disclaimer, the term of this patent is extended or adjusted under 35 U.S.C. 154(b) by 187 days.

This patent is subject to a terminal disclaimer.

(21) Appl. No.: 11/786,997

(22) Filed: Apr. 13, 2007

(65) Prior Publication Data

US 2007/0271889 A1  Nov. 29, 2007

Related U.S. Application Data

(63) Continuation-in-part of application No. 11/440,167, filed on May 24, 2006.

(51) Int. Cl.
*B01D 39/14* (2006.01)

(52) U.S. Cl. .............................. 55/524; 55/497; 55/521; 55/527; 55/DIG. 5; 210/503; 210/505; 442/415; 442/416; 442/428; 442/442

(58) Field of Classification Search ............... 52/497, 52/524, 521, 527, 528, DIG. 5; 442/416, 442/416.415, 428, 442; 210/503, 505
See application file for complete search history.

(56) References Cited

U.S. PATENT DOCUMENTS

| | | | | |
|---|---|---|---|---|
| 3,622,446 A | * | 11/1971 | Burnham | ............ 162/146 |
| 4,286,977 A | | 9/1981 | Klein | |
| 4,751,134 A | | 6/1988 | Chenoweth et al. | |
| 5,252,275 A | * | 10/1993 | Sultze et al. | ............ 264/119 |
| 5,272,000 A | | 12/1993 | Chenoweth et al. | |
| 5,336,286 A | * | 8/1994 | Alexander et al. | ............ 55/528 |
| 5,772,846 A | | 6/1998 | Jaffee | |
| 5,876,551 A | | 3/1999 | Jackson | |
| 6,010,785 A | * | 1/2000 | Kruszewski | ............ 428/362 |
| 6,110,846 A | | 8/2000 | Brzozowski et al. | |
| 6,127,292 A | | 10/2000 | Brzozowski et al. | |
| 6,159,315 A | | 12/2000 | Haszler et al. | |
| 6,341,462 B2 | | 1/2002 | Kiik et al. | |
| 6,475,315 B1 | | 11/2002 | Kean et al. | |
| 6,579,350 B2 | | 6/2003 | Doherty | |
| 6,649,547 B1 | | 11/2003 | Arnold et al. | |
| 2003/0124932 A1 | | 7/2003 | Droux | |
| 2004/0116026 A1 | | 6/2004 | Kubose et al. | |
| 2004/0224594 A1 | | 11/2004 | Choi et al. | |
| 2005/0112978 A1 | | 5/2005 | Jaffee et al. | |
| 2005/0160711 A1 | | 7/2005 | Yang | |
| 2005/0288861 A1 | | 12/2005 | Abraham et al. | |

FOREIGN PATENT DOCUMENTS

WO    WO 01/58825    8/2001

OTHER PUBLICATIONS furnacefiltercare.com "Understanding MERV Ratings". Copyright 2005.*
Leonard Arenson Heat & A/C. "Air Filter Tutorial". Copyright 2007.*

* cited by examiner

*Primary Examiner*—Duane Smith
*Assistant Examiner*—Christopher P Jones
(74) *Attorney, Agent, or Firm*—Robert D. Touslee

(57) ABSTRACT

Wet laid, nonwoven, fibrous mats suitable for making MERV 6 or higher, filters, and methods of making the nonwoven mats filter media are disclosed. The mats include a blend comprising a major portion of glass fibers, a minor portion of man-made polymer fibers, such as polyester fibers and about 0-30 wt. percent of chemically cross linked bleached Kraft pulp the fibers, and optionally fully bleached softwood Kraft pulp, the fibers being bound together with a cured binder having a Tg in the range of about minus 30 to about 50 degrees C. The mats are pleated prior to assembling the filter in conventional manner. The only fibrous mat in the filters is wet laid fibrous nonwoven mat and the pleated filter media needs no other means of support in the filter frame.

45 Claims, No Drawings

NONWOVEN FIBROUS MAT FOR MERV FILTER AND METHOD

This application is a continuation-in-part of U.S. patent application Ser. No. 11/440,167 filed May 24, 2006. The present invention relates to methods of making fibrous, nonwoven mats or filter media for use in air filter fabrication and other applications where similar requirements exist and the filter media mats so made.

BACKGROUND

A relatively new ASHRAE standard abbreviated MERV shows a filter's minimum performance through its life, allowing the contractor or building owner to select filters knowing their "worst case" efficiency. It measures a filter's ability to remove particles of specific sizes when the filter is new. The old standard does not tell you a filter's efficiency in removing specific particle sizes (such as lung-damaging respirable particles). By comparison, with the ASHRAE 52.2-1999 test, particle counters measure the number of airborne particles with diameters of 0.3 to 10.0 microns, both upstream and downstream of the air filter. Using this information, it becomes possible to take a highly targeted approach to filter selection. Once the test is completed, the filter's minimum efficiency values at various particle sizes are recorded. These efficiency values are then used to assign a MERV number to the filter. Designations range from MERV 1 (typically a low efficiency, throwaway filter) up to MERV 16 (a 95%-plus efficiency filter). The new MERV system is much more comprehensive than previous systems, and it enables one to compare efficiencies of filters at a glance. Minimum Efficiency Reporting Value, or MERV for short, is a filter rating system devised by the American Society of Heating, Refrigeration and Air conditioning Engineers (ASHRAE) to standardize and simplify filter efficiency ratings for the public. The higher the MERV rating, the higher the efficiency of the air filter. Simply stated, a MERV 12 filter will remove more smaller particles from the air than a MERV 8 filter.

The MERV system allows the consumer to effectively compare one brand of filter to another. Without any value-added additions, any MERV 6 filter will perform about the same as any other MERV 6 filter. The MERV rating only applies to efficiency of the filter. The presence of other functional ingredients in the filter, such as anti-bacterial treatment and/or baking soda, are value-added benefits and are not a part of the MERV rating system. In the 3-10 micron range of particle diameters, a MERV 6 filter will be about 35-50 percent efficient. A particle that is 10 microns or less in size is not visible to the naked human eye. If allergies or asthma are your concern, we suggest you choose a MERV 8 filter at a minimum.

In the past furnace filters were made from relatively coarse continuous fibers laid down in a random pattern and built up in layers on a drum and by carding dry staple fibers and forming webs of the carded fibers. Such filters, in recent years at least, fall short of removing as small of particles and as many particles as desired. Average efficiency is really not a realistic measure of filter performance because it exaggerates performance for the early part of the filter's actual service life. This is because when an air filter is first installed its efficiency is at its lowest point because it hasn't built up enough lint and particles on the filter to help trap more and smaller lint and particles. Some of these filters had low efficiencies and others had other disadvantages such as low physical integrity and high bulk preventing pleating or making it very difficult. Also, cost is an issue. In U.S. Pat. No. 6,579,350 some of this is confirmed and addressed by using a layer of wet laid fibers to attempt to minimize the shortcomings of dry or air laid filtration media, but that process and filter is still complex and expensive.

SUMMARY OF THE INVENTION

The present invention is a wet laid nonwoven mat for use as filtration media, a filter made using this wet laid media and the method of making a low cost, efficient gas filter, filtration media and a filter having a MERV rating of at least 6. The filtration media of the invention is a wet laid fibrous mat comprising about 60-20 wt. percent glass fibers, about 15-60 wt. percent polymer fibers, including polyester, about 0-30 wt. percent of cellulosic fibers and about 15-40 wt. percent, dry basis, of a binder to bond the fibers together. The major portion of the glass fibers have a diameter of at least about 3 microns and up to about 16 microns with 11 microns being particularly effective. The polymer fibers usually have a denier of about 1.5 and can range from micro-denier up to about 6 denier. The binder is usually a latex such as an acrylic resin modified with melamine formaldehyde having a glass transition temperature in the range of about minus 30 to about 50 degrees C. or other resins having a glass transition temperature in this range. A more typical glass transition temperature range is from about 20 to about 50 degrees C. Binders with a glass transition temperature in the 25-50 degree C. range yield a filter element with self supporting pleats and eliminate the need for expensive wire or other complex supports. Binder fibers including polyvinyl alcohol fibers, polyolefin fibers and other known binder fibers, dispersed with the glass fibers, can be used to replace part or all of the latex binder. Additionally, cellulosic fibers or a small percentage of fine glass fibers like glass microfibers can be added to increase strength and filtration efficiency.

The method of the invention comprises;
a) Dispersing the fibers in a conventional white water containing a viscosity enhancing agent to produce a dispersion, the dispersion comprising glass fibers and man-made polymer fibers,
b) subjecting the dispersion to a moving permeable forming belt to form a fibrous web,
c) optionally applying an aqueous resin binder to the wet web and removing any excess binder to produce the desired binder content in the wet web, and
d) drying the wet web and curing the resin in the binder to form a resin bound fibrous non woven filtration media
e) pleating the filtration media and
f) assembling the pleated filtration media into a filter for filtering air and other gases, the improvement comprising:
dispersing glass fibers and polymer fibers in the conventional whitewater in a ratio of about 0.4-3 parts glass fiber to 1 part of polymer fibers, the glass fibers having a diameter of about 3 microns to about 16 microns and a length between about 0.2 inch and about 1 inch, the polymer fibers having a denier in the range of less than 1 to about 6 and a length in the range of about 0.25 inch to about 0.5 inch, and optionally applying an aqueous latex binder having a glass transition temperature in the range of about minus 30 to about 50 degrees C. in sufficient amount to produce a dry binder content in the range of about 15 to about 40 wt. percent in the dry filtration media, whereby the resultant filter media, when pleated and formed into a pleated gaseous filter using conventional pleating and assembly techniques, produces a filter meeting at least MERV 6 specifications and requires no additional means of support in the pleated gaseous filter.

The filtration efficiency can be controlled by varying the basis weight, the fiber diameter and type of fiber, and the basis weight of the wet laid filtration media. The binder choice can also affect sheet density by forming "bridge" or "webs" between the fibers at their crossing points thus reducing porosity of the mat. The filtration performance of the novel wet laid filtration media of the invention and resultant filters is surprising to many in the industry because they have not been exposed to this type of filtration media.

Fiber blends including glass microfibers, cellulose, and other micro-denier fibers which facilitate a torturous path of the air or gaseous flow through the filter media results in increased filtration efficiency and also added dirt holding capacity to the filter. The use of up to about 30 wt. percent, based on the weight of the fibers in the dry mat, of a chemically cross linked bleached Kraft pulp, such as Weyerhaeuser's CHBSLM, surprisingly increases the dirt holding capacity of the filter media. Also, using up to about 30 wt. percent, based on the weight of the fibers in the dry mat, of a fully bleached softwood Kraft pulp, such as Weyerhaeuser's Kamloops Chinook, adds bulk and fills the sheet sufficiently to increase filtration efficiency from a MERV 6 to a MERV 7 and adds stiffness to the mat and filter media. Typically, the cellulosic fibers described above are present in the mat in amounts of about 15+/−10 wt. percent of the fibers in the mat and most typically are present in amounts of about 15+/−5 wt. percent.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF PREFERRED EMBODIMENTS

The polymer fibers are preferably polyester fibers, but can also be any polymer fiber such as polypropylene, nylon, PBT, polyacrynitrile, polybenzimidizole, and other known polymer fibers having similar resilience, toughness and a softening point high enough to tolerate the temperatures used in the mat manufacturing process and subsequent processes that the mats are used in. The preferred diameter of the polyester fibers is about 1.5 denier, but both the length and diameter can be varied so long as the aspect ratio, length to diameter, remains within a range suitable satisfactorily dispersing the fibers in an aqueous inorganic fiber slurry suitable for forming a web on an wet laid web forming machine, such as an inclined wire former such as a VOITH HYDROFORMER® or a SANDY HILL DELTAFORMER®. The preferred length of 1.5 denier polyester fibers is 0.25 inch. The polymer fibers can also include known binder fibers including polyvinyl alcohol fibers and/or polyolefin fibers like polypropylene fibers and/or polyethylene fibers to replace all or a part of the latex binder.

The denier of the polyester fibers can range from about 0.8 to about 6 denier and the fiber length will often be changed depending on the denier to get good dispersion, as is well known. The man-made polymer fibers can, but need not be, longer as the denier is increased. If tangling and/or roping causing clumps or bundles during dispersion, the length of the man-made polymer fibers must be reduced to get good dispersion.

The inorganic fibers are typically glass fibers and typically 0.5 inch long, 11 micron diameter, E glass fibers having a chemical sizing thereon as is well known. One fiber product preferred for use in the present invention is H117, a wet chopped fiber product available from Johns Manville Corporation of Denver, Colo., but any type of glass fiber can be used in lengths and diameters suitable for the wet laid processes. Any type of stable glass fibers can be used, such as A, C, S, R, E and other types of glass fibers. Typically the average fiber diameter of glass fibers will range from about 8 to about 20 microns with fiber length ranging from about 0.25 to about 1.5 inches, more typically from about 0.25 to about 1 or 1.25 inches and most typically from about 0.3 to about 0.75 inches.

The fiber blend webs are bound together by use of an aqueous binder composition applied with a curtain coater, dip and squeeze, roller coat, or other known saturating method in a known manner and the resultant saturated wet bindered web laying on a supporting wire or screen is run over one or more vacuum boxes to remove enough binder to achieve the desired binder content in the mat. The binder level in the inventive mats can range from about 10 to about 35 or 40 wt. percent of the finished dry mat, preferably about 15 to about 30 wt. percent and most typically from about 18 to about 25 wt. percent, such as about 20+/−3 wt. percent. The binder composition is curable by the application of heat, i.e., the binder composition is a cross-linked thermoplastic composition.

The binder composition is an acrylic latex with a glass transition temperature, Tg, in the range of −30 to +50 degrees C., more typically in the range of about minus 5 to about 40 degrees C. and most typically in the range of about 5 to about 30 degrees C., or equivalent performing resins and Tg's. The acrylic latex can be modified by addition of melamine formaldehyde to enhance cross-linking which adds stiffness and heat resistance. Suitable acrylic latex materials include Hycar® 26138, a +25 C. $T_g$ a material manufactured by Noveon of Brecksville, Ohio. This latex when mixed with about 2.5% melamine-formaldehyde (MF) resin such as Aerotex™ 3030 also made by Noveon yields a moderately stiff mat that pleats well and also has the added advantage of requiring no additional mechanical support to hold the pleats such as metal wire or complex cardboard frames for the resulting filters. Another suitable acrylic latex is Hystretch™ V-29, also made by Noveon. This material is a −29 C $T_g$ latex that yields a very soft and flexible fabric or applications not requiring a self supporting pleat.

The glass and polyester fibers that form the base material can be formed into a structure suitable for use as an air filter. Any suitable means for forming the fibers into a mat can be used. For example, the fibers can be formed by the processes described in U.S. Pat. Nos. 5,840,413, 5,772,846, 4,112,174, 4,681,802 and 4,810,576, the entire contents of which are incorporated by reference herein. A dilute aqueous slurry of the glass and polymer fibers can be formed and deposited onto an inclined moving screen forming wire to dewater the slurry and form a wet nonwoven fibrous mat in a conventional manner. For example, a Hydroformer available from Voith-Sulzer located in Appleton, Wis., or a Deltaformer available from Valmet/Sandy Hill located in Glenns Falls, N.Y., can be used. Other similar wet mat machines can be used.

After forming the wet, uncured web, it is preferably transferred to a second moving screen running through a binder application station where the aqueous binder described above is applied to the mat. The binder can be applied to the structure by any suitable means including, for example, air or airless spraying, padding, saturating, roll coating, curtain coating, beater deposition, coagulation or dip and squeeze application. The excess binder, if present, is removed to produce the desired binder level in the mat. The web is formed and the binder level controlled to produce a binder content in the finished dry mat as described above and to produce a dry mat product having a basis weight of between about 0.5 lbs./100 sq. ft. to about 3 lbs./100 sq. ft., more typically from about 0.75 lbs./100 sq. ft. to about 1.75 lbs./100 sq. ft. such as about 1.25+/−0.25 lbs./100 sq. ft. The wet mat is then preferably transferred to a moving oven belt which transports the wet mat through a drying and curing oven such as, for example, a through air, air float or air impingement oven. Prior to curing, the wet mat can be optionally slightly compressed, if desired, to give the finished product a predetermined thickness and surface finish.

In the oven, the bindered web can be heated to effect drying and/or curing forming a dry mat bonded with a cured binder. For example, heated air can be passed through the mat to remove the water and cure the binder. For example, the heat treatment can be around 400 F. or higher, but preferably the mat is at or near the hot air temperature for only a few seconds in the downstream end portion of the oven. The duration of the hear treatment can be any suitable period of time such as, for example, from about 3 seconds to 5 minutes or more, but normally takes less than 3 minutes, preferably less than 2 minutes and most preferably less than 1 minute. It is within the ordinary skill of the art, given this disclosure, to vary the curing conditions to optimize or modify the mat to have the desired properties. The drying and curing functions can be conducted in two or more distinct steps. For example, the binder composition can be first heated at a temperature and for a time sufficient to substantially dry but not to substantially cure the composition and then heated for a second time at a higher temperature and/or for a longer period of time to effect curing. Such a procedure, referred to as "B-staging," can be used to provide binder-treated nonwoven, for example, in roll form, which can at a later stage be cured, with or without forming or molding into a particular configuration, concurrent with the curing process. The following examples are provided for illustrative purposes and are in no way intended to limit the scope of the present invention.

EXAMPLE 1

A self supporting MERV 6 media was made using a wet process described above with 40% H 117 glass fibers from Johns Manville of Denver Colo. 40 wt. % 1.5 d PET fibers and 20 wt. % of a binder consisting of 97.5 wt. percent Hycar™ 26138 acrylic latex and 2.5 percent Aerotex 3030 both from Noveon. The media was converted into a pleated self supporting MERV 6 filter panel in a conventional manner. The resulting properties are shown in Table 1.

EXAMPLE 2

A MERV 6 media for a wire supported filter panel was made using a wet process described above with 40 wt. % H117 glass fibers, 40 wt. 1.5 d PET fibers and 20 wt. % of a binder consisting of 100% Hystretch™ V-29 acrylic latex from Noveon. The media was converted into a pleated wire supported MERV 6 filter panel in a conventional manner. The resulting properties are shown in Table 1.

EXAMPLE 3

A self supporting MERV 7 media was made using a wet process described above with 36 wt. % H117 glass, 32 wt. % 1.5 d PET fiber, 12 wt. % cellulose fluff pulp, and 20 wt. % of a binder consisting of 97.5% Hycar® 26138 acrylic latex and Aerotex™ 3030, both from Noveon. The media was converted into a pleated self supporting MERV 7 filter panel in a conventional manner. The resulting properties are shown in Table 1.

EXAMPLE 4

A self supporting MERV 7 media was made using a wet process described above with 36 wt. % H117 glass fibers, 36 wt. % 1.5 d PET fiber, 8 wt. % 3 micron mean diameter glass microfiber, and 20 wt. % of a binder consisting of 97.5% Hycar® 26138 acrylic latex and 2.5 wt. % Aerotex™ 3030, both from Noveon. The media was converted into a pleated self supporting MERV 7 filter panel. The resulting properties are shown in Table 1.

EXAMPLE 5

A self supporting MERV 6 media was made using a wet process described above with 40 wt. % H 117 glass fibers from Johns Manville of Denver, Colo., 28 wt. % 1.5 d PET fibers, 12 wt. % of a chemically cross linked bleached Kraft pulp, Weyerhaeuser's CHBSLM and 20 wt. % of a binder consisting of 97.5 wt. percent Hycar™ 26138 acrylic latex and 2.5 wt. percent Aerotex 3030, both from Noveon. The media was converted into a pleated wire supported MERV 6 filter panel in a conventional manner, but stiffness properties indicated ability to also make the filter in an unsupported mode. The resulting properties are shown in Table 2.

EXAMPLE 6

A self supporting MERV 7 media was made using a wet process described above with 28 wt. % H 117 glass fibers from Johns Manville of Denver, Colo., 40 wt. % 1.5 d PET fibers, 12 wt. %, a fully bleached softwood Kraft pulp, Weyerhaeuser's Kamloops Chinook™, and 20 wt. % of a binder consisting of 97.5 wt. percent Hycar™ 26138 acrylic latex and 2.5 wt. percent Aerotex 3030, both from Noveon. The media was converted into a pleated, wire supported MERV 7 filter panel in a conventional manner, but stiffness indicated an ability to also make the filter in an unsupported mode. The resulting properties are shown in Table 2.

TABLE I

Data From Examples

|  | Ex. 1 | Ex. 2 | Ex. 3 | Ex. 4 |
|---|---|---|---|---|
| Basis wt. (gms/sq. m) | 57.15 | 61.55 | 59 | 63 |
| Thickness (mils) | 26 | 23 | 24 | 27 |
| Binder Tg | 25 | −29 | 25 | 25 |
| MD Tensile (lbs./3 in.) | 45 | 16 | 55 | 52 |
| CMD Tensile (lbs./3 in.) | 53 | 20 | 59 | 56 |
| Taber ® Stiffness | 14.5 | 2.7 | 16.8 | 15.3 |
| Fraser Air Perm (CFM/sq. ft.)* | 643 | 546 | 531 | 489 |
| Full Filter Efficiency*** (%) | 36 | NA | 44 | NA |
| Full Filter Delta P (in. WC) | 0.101 | NA | 0.161 | NA |
| ASHRAE Dust Holding Cap. g/sq. ft. | 4.5**** | NA | NA | NA |

*At 0.5 in. water column (WC)
** A 2 ft. by 2 ft. sample of mat was tested at an air flow rate of 21.6 CFM with same particles as the standard full filter test.
***After mat has been pleated and assembled into a filter it was tested using the ASHRAE 52.2 Standard Test Procedure.
****Using ISO fine dust to a pressure drop of 0.5" WC.

TABLE 2

Initial Dust Holding Capacity (grams/sq. ft.) and ISO Fine dust to 0.5 inch water pressure drop efficiency

| Example 1 | 4.5 | 44 |
|---|---|---|
| Example 5 | 6.2 | 41 |
| Example 6 | NA | 58 |

The filters made with the mat of Examples 1 and 3 met MERV 6 specifications and it is expected that the mat of Example 4, when assembled into a filter, will also meet MERV 6 specifications and possibly a higher MERV specification. Example 2 shows that the Taber stiffness of the mat should be at least about 2, more typically at least about 5, and Examples 1, 3 and 4 show that the Taber stiffness is most typically at least about 10.

By modifying the above method in the drying/curing step and using a thermosetting binder such as phenol-formaldehyde, melamine-formaldehyde or polyacrylic acid crosslinked with a polyol, a mat with different characteristics is produced. The modification is to drop the temperature in the oven such that the binder in the mat is cured to only a "B" stage condition. This can be achieved by heating the mat to only about 250 degrees F. in the oven. The time at lower maximum temperature can be varied, but typical time is about 30 seconds. Mats made with this modification can be thermoformed to a desired shape, or pleated and then heated to complete the cure of the binder. The desired shape will then be retained in the mat. Such molded shapes can have many uses such as performs for SRIM and laminating processes, pleated filters and many other uses.

While the invention has been described with preferred embodiments, it is to be understood that variations and modifications can be resorted to as will be apparent to those skilled in the art. Just for the purposes of illustration of variations included in the present invention, carbon black can be incorporated into the binder to affect color as can titania particles if a white mat is desired.

The invention claimed is:

1. A method for making a fibrous, wet laid, nonwoven pleatable filter media comprising;
   a) dispersing fibers comprising different types of fibers in a fluid dispersion,
   b) subjecting the dispersion to a moving forming screen to form a wet laid fibrous web,
   c) optionally applying an aqueous resin binder to the web in sufficient amount to produce a binder level in the filter media of about 18 to about 25 wt. percent, and
   d) drying the wet web and at least partially curing the resin in the binder to form a resin bound fibrous, wet laid, nonwoven pleatable dry mat, wherein;
      i) the fiber dispersion comprises about 28 to about 40 weight percent polymer fibers, having a denier in the range of microdeniers to 6, about 40 to about 28 weight percent H glass fibers about 0.5 to about 1 inch long and about 15+/−10 wt. percent of either a chemically cross linked bleached Kraft pulp or a fully bleached softwood Kraft pulp, based on the weight of said pleatable dry mat, and
      ii) the aqueous binder comprises a mixture of water and an acrylic resin having a glass transition temperature in the range of about 5 to about 30 degrees C. whereby the resultant filter media, when pleated and formed into a pleated gaseous filter using conventional pleating and assembly techniques produces a filter meeting at least MERV 6 specifications and requires no additional means of support in the pleated gaseous filter.

2. The method according to claim 1, wherein the H glass fibers comprise about 40 wt. percent, the man-made polymer fibers comprise about 28 wt. percent and the chemically cross linked bleached Kraft pulp fibers comprise about 15+/−10 wt. percent of said pleatable mat.

3. The method according to claim 1 wherein the binder is a melamine formaldehyde modified acrylic latex.

4. The method according to claim 2 wherein the binder is a melamine formaldehyde modified acrylic latex.

5. The method of claim 2 wherein the binder content is in the range of about 20+/−3 wt. percent.

6. The method of claim 4 wherein the binder content is in the range of about 20+/−3 wt. percent.

7. The method of claim 5 wherein the man-made polymer fibers are PET fibers of 1.5 denier and said Kraft pulp fibers comprise about 15+/−5 wt. percent of the filter media.

8. The method of claim 6 wherein the man-made polymer fibers are PET fibers of 1.5 denier and said Kraft pulp fibers comprise about 15+/−5 wt. percent of the filter media.

9. The method of claim 1 wherein the H glass fibers comprise about 28 wt. percent, the man-made polymer fibers comprise about 40 wt. percent and the fully bleached softwood Kraft pulp fibers comprise about 15+/−10 wt. percent of said pleatable mat and wherein the resultant filter meets the requirements of a MERV 7 filter.

10. The method of claim 9 wherein the binder content is about 20+/−3 wt. percent and the denier of the man made polymer fibers is about 1.5.

11. The method of claim 9 wherein the man made polymer fibers are PET fibers and said Kraft pulp fibers comprise about 15+/−5 wt. percent of said pleatable mat.

12. The method of claim 10 wherein the man made polymer fibers are PET fibers and said Kraft pulp fibers comprise about 15+/−5 wt. percent of said pleatable mat.

13. The method of claim 8 wherein the binder is a melamine formaldehyde modified acrylic latex, the binder is present in an amount of about 20 wt. percent and said Kraft pulp fibers are present in an amount of about 12 wt. percent.

14. The method of claim 11 wherein the binder is a melamine formaldehyde modified acrylic latex, the binder is present in an amount of about 20 wt. percent and said Kraft pulp fibers are present in an amount of about 12 wt. percent.

15. The method of claim 12 wherein the binder is a melamine formaldehyde modified acrylic latex, the binder is present in an amount of about 20 wt. percent and said Kraft pulp fibers are present in an amount of about 12 wt. percent.

16. A wet laid fibrous, dry nonwoven pleated filter media comprising a about 28 to about 40 weight percent H glass fibers having a length of about 0.5 to about 1 inch, about 15+/−10 wt. percent of either chemically cross linked bleached Kraft pulp fibers or fully bleached softwood Kraft pulp fibers and about 28 to about 40 percent man-made polymer fibers, having deniers from microdeniers to about 6, in said filter media, the fibers in the mat being bound together with about 18 to about 25 wt. percent of a binder derived from an acrylic latex, the acrylic latex binder having a Tg in the range of about 5 to about 30 degrees C., the filter media, after pleating in a conventional manner to form said filter media and assembled into a gaseous filter in which said filter media is unsupported and the filter meets at least MERV 6 specifications.

17. The filter media of claim 16 wherein the H glass fibers comprise about 40 wt. percent, the man-made polymer fibers comprise about 28 wt. percent and the chemically cross linked bleached Kraft pulp fibers comprise about 15+/−10 wt. percent of the dry mat.

18. The filter media of claim 16 wherein the binder is a melamine formaldehyde modified acrylic latex.

19. The filter media of claim 17 wherein the binder is a melamine formaldehyde modified acrylic latex.

20. The filter media of claim 16 wherein the binder content is in the range of about 20+/−3 wt. percent.

21. The filter media of claim 18 wherein the binder content is in the range of about 20+/−3 wt. percent.

22. The filter media of claim 17 wherein the binder content is in the range of about 20+/−3 wt. percent.

23. The filter media of claim 19 wherein the binder content is in the range of about 20+/−3 wt. percent.

24. The filter media of claim 16 wherein the H class fibers comprise about 28 wt. percent, the man-made polymer fibers comprise about 40 wt. percent and the fully bleached softwood Kraft pulp fibers comprise about 15+/−10 wt percent of said filter media.

25. The filter media of claim 24 wherein the binder content is about 20+/−3 wt. percent and the denier of the man made polymer fibers is about 1.5.

26. The filter media of claim 24 wherein the man-made polymer fibers are PET fibers and said Kraft pulp fibers comprise about 15+/−5 wt. percent of said filter media.

27. The filter media of claim 25 wherein the man-made polymer fibers are PET fibers and said Kraft pulp fibers comprise about 15+/−5 wt. percent of said filter media.

28. The filter media of claim 19 wherein the man-made polymer fibers are PET fibers and said Kraft pulp fibers comprise about 15+/−5 wt. percent of said filter media.

29. The filter media of claim 23 wherein the man-made polymer fibers are PET fibers and said Kraft pulp fibers comprise about 15+/−5 wt. percent of said filter media.

30. A filter for gases having a MERV rating of at least 6, the filter containing a filter media consisting essentially of a wet laid, dry and pleated unsupported mat filter media, said filter media comprising a blend of fibers comprising about 28 to about 40 wt. percent H glass fibers having a length of about 0.5 to about 1 inch long and about 40 to about 28 wt. percent man-made polymer fibers and about 15+/−10 wt. percent of either chemically cross linked bleached Kraft pulp fibers or fully bleached softwood Kraft pulp fibers, the fibers in said filter media being bound together with about 18 to about 25 wt. percent, based on the weight of said filter media, of a binder derived from an acrylic latex having a Tg in the range of about 5 to about 30, the pleated filter media requiring no additional means of support in the filter.

31. The filter of claim 30 wherein the H glass fibers are present in an amount of about 40 wt. percent, the man-made polymer fibers are present in an amount of about 28 wt. percent and the chemically cross linked bleached Kraft fibers comprise about 15+/−10 wt. percent of said filter media.

32. The filter of claim 31 wherein the binder is present in an amount of about 20+/−3 wt. percent of the filter media.

33. The filter of claim 31 wherein said Kraft pulp fibers are present in an amount of about 15+/−5 wt. percent of said filter media.

34. The filter of claim 32 wherein said Kraft pulp fibers are present in an amount of about 15+/−5 wt. percent of said filter media.

35. The filter of claim 30 wherein the H glass fibers are present in an amount of about 28 wt. percent, the man-made polymer fibers are present in an amount of about 40 wt. percent and the fully bleached softwood Kraft pulp fibers are present in an amount of about 15+/−10 wt. percent of said filter media and wherein the filter has a MERV rating of 7.

36. The filter of claim 35 wherein said filter media contains about 15+/−5 wt. percent of said Kraft pulp fibers.

37. The filter of claim 35 wherein said Kraft pulp fibers are present in an amount of about 12 wt. percent.

38. The filter of claim 35 wherein said binder is present in an amount of about 20 wt. percent.

39. A filter according to claim 36 wherein said binder is present in an amount of about 20 wt. percent.

40. A filter according to claim 37 wherein said binder is present in an amount of about 20 wt. percent.

41. The filter of claim 35 wherein the binder is a melamine formaldehyde modified acrylic latex.

42. The filter of claim 36 wherein the binder is a melamine formaldehyde modified acrylic latex.

43. The filter of claim 39 wherein the binder is a melamine formaldehyde modified acrylic latex.

44. The filter of claim 33 wherein the binder is a melamine formaldehyde modified acrylic latex.

45. The filter of claim 34 wherein the binder is a melamine formaldehyde modified acrylic latex.

* * * * *